Dec. 23, 1958     C. R. MURPHY     2,865,822

METHOD FOR DEIONIZING AQUEOUS PENTAERYTHRITOL SOLUTIONS

Filed April 30, 1956

INVENTOR
CLARENCE R. MURPHY

BY

ATTORNEY

2,865,822

METHOD FOR DEIONIZING AQUEOUS PENTAERYTHRITOL SOLUTIONS

Clarence R. Murphy, Tulsa, Okla., assignor to Warren Petroleum Corporation Inc., Tulsa, Okla., a corporation of Delaware Application April 30, 1956, Serial No. 581,712

6 Claims. (Cl. 204—72)

This invention relates to method for deionizing aqueous pentaerythritol solutions.

In the manufacture of pentaerythritol, it is necessary to use an alkaline catalyst such as sodium hydroxide to cause the proper reaction between acetaldehyde and formaldehyde. In the course of this reaction, the sodium hydroxide is converted to sodium formate and this sodium formate must be separated from the pentaerythritol before it can be sold.

The method presently in use for this separation includes evaporation and fractional crystallization. Such process involves several evaporation, heating and cooling steps and requires large amounts of wash water to remove the residual sodium formate from the pentaerythritol crystals when they are centrifuged or filtered. Sodium hydroxide cannot be recovered for reuse in the above process and the recovery of formic acid for sale is low (50% of theoretical).

The inorganic material is separated as crude sodium formate. It would be impossible to obtain sodium hydroxide economically by this method to be recycled back to the reaction mixture and to recover formic acid from this process, it would be necessary to acidify the sodium formate with sulfuric acid or other mineral acids which would involve considerable processing and process equipment to purify the acid and the other sodium salts.

Among the objects of the present invention is included purification of pentaerythritol to deionize or demineralize it by ion exchange and electrolysis.

Further objects include simplification of purification treatments for pentaerythritol; and in addition, higher recoveries of formic acid and caustic, and reuse of the caustic in the process.

Still further objects and advantages of the present invention will appear from the more detailed description set forth below, it being understood that such more detailed description is given by way of illustration and explanation, but not for limitation, since various changes therein may be made by those skilled in the art without departing from the scope and spirit of the present invention.

Figure 1:
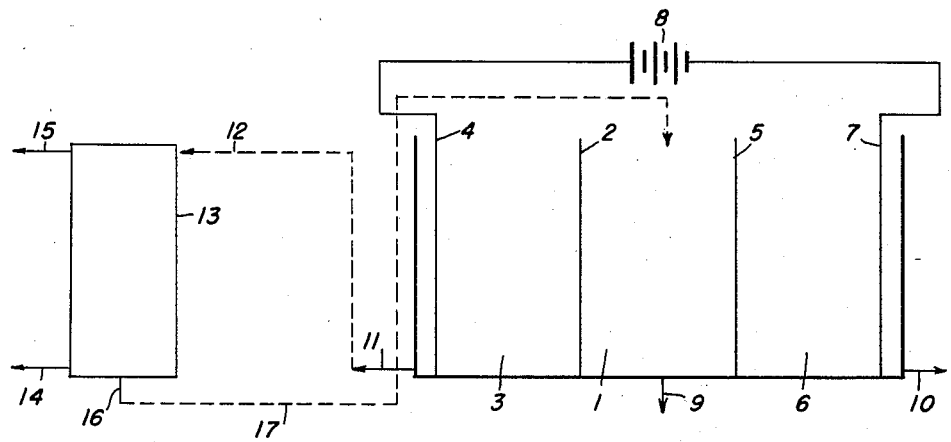
Figure 2:
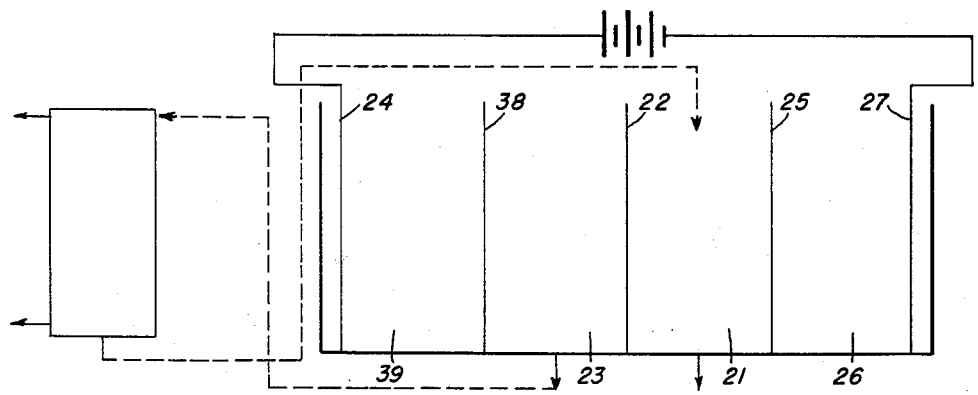

In connection with that more detailed description, there is shown in the accompanying drawing, in Figure 1, a diagrammatic representation of an electrolytic cell and associated flow sheet for practicing the invention; and in Figure 2, a modified form of the system of Figure 1.

In accordance with the present invention, aqueous pentaerythritol containing salts, as exemplified by sodium formate, is substantially deionized by electrodialyzing the solution with direct current to transport ions formed from the salt in aqueous solution through exchange membranes to convert the ions into acids and caustic that are separately collected and either reused in the process or stored for sale, while substantially deionized pentaerythritol aqueous solution is separated. Solutions that may be purified in this way are exemplified by the pentaerythritol syrups obtained during manufacture as in reaction of acetaldehyde and formaldehyde in the presence of an alkaline catalyst such as sodium hydroxide. Analogous solutions obtained in pentaerythritol solutions with other catalysts may also be deionized by the present invention provided that contaminating components such as salts are present which can be removed by ion transport and converted by ion exchange into soluble materials that can be accumulated in anode and cathode compartments.

By the present invention, the aqueous pentaerythritol containing the salt impurity such as sodium formate is electrodialyzed with direct current to transport formic acid ions through an ion exchange membrane or barrier where the ions are converted into formic acid and collected in an anode compartment, while simultaneously the sodium ions are transported through a cation exchange membrane or barrier where they form caustic soda and are collected in a cathode compartment. Deionized pentaerythritol is recovered from the dissociation zone.

Since some pentaerythritol will migrate with the formic acid ions, the pentaerythritol in the formic acid may be recovered therefrom as by extraction of the formic acid solution with a solvent for the formic acid, such as methyl isobutyl ketone, the solvent solution of formic acid separated from the aqueous pentaerythritol and the latter, usually containing a small amount of formic acid, recycled to the dissociation zone. The solvent solution of the formic acid is recovered, the solvent separated as by distillation from the formic acid. Formic acid may also be recycled back from the anode compartment to the dissociation zone to maintain a desired pH therein.

Insofar as any theoretical explanations are given herein, they are not to be considered limiting since the factual situation is established.

In the method that may be carried out in the apparatus of Figure 1 of the drawing, compartment 1 of the cell, is the dissociation compartment in which the aqueous pentaerythritol containing sodium formate to be deionized, is placed. Compartment 1 is separated by anion exchange membrane 2 through which formic acid ions from compartment 1 are transported. These ions are converted to formic acid which accumulates in anode compartment 3 having anode 4. Compartment 1 is also separated by cation exchange membrane 5 through which sodium ions pass. These ions are converted to caustic soda which accumulates in cathode compartment 6 in which cathode 7 is placed. The anode and cathode are connected to source 8 of direct current.

Deionized pentaerythritol is removed through outlet 9 from dissociation compartment 1, and sodium hydroxide may be removed through outlet 10 from cathode compartment 6. Formic acid solution may be removed through outlet 11 from anode compartment 3. Some of this formic acid may be recycled directly from outlet 11 back to dissociation compartment 1 to maintain pH desired therein. However, the pH may be regulated in a different manner, for example as set forth below.

Since some pentaerythritol migrates through anion exchange membrane 2, it is desirable to recover the pentaerythritol from the formic acid solution. For this purpose, formic acid solution withdrawn through outlet 11 is conveyed through conduit 12 to the upper portion of a counter current extractor 13 where it moves downwardly in counter current to solvent entering through inlet 14 in the bottom portion of extractor 13. The solvent as explained above is a solvent for formic acid, but desirably a non-solvent for pentaerythritol, and in its movement upwardly in extractor 13 strips formic acid from the aqueous pentaerythritol. The solvent formic acid solution is removed through outlet 15 in the upper portion of extractor 13, and may then be treated as by distillation to recover and recycle solvent, or in any other way. The recovered aqueous pentaerythritol is taken off from extractor 13 through outlet 16 in the bottom thereof and recycled through conduit 17 to the dissociation zone 1. Solvent extraction can be controlled as desired to determine the amount of feed-back of formic acid and in this way control the pH in zone 1.

A modificaion of the system described above is shown in Figure 2. In this system, the cell has compartments 21, 23, and 26 corresponding with compartments 1, 3 and 6 of Figure 1 respectively separated with anion exchange membrane 22 and cation exchange membrane 25, and these elements function exactly like their counterparts in Fig. 1. However, the anode compartment is separated into two subcompartments by cation membrane 38, 23 being the formic acid accumulating zone while 39 constitutes a non-formic acid subcompartment in which anode 24 is placed. Cathode 27 is placed in compartment 26. The electrolyte in compartment 39 is desirably an acid such as dilute sulfuric acid so that electrolysis produces hydrogen which passes through cation membrane 38 to saturate the formic anion in compartmment 23.

In the process of Figure 1, it is desirable to use an anode of platinum and a stainless steel cathode. In the system of Figure 2, the anode may be lead. Otherwise, the recovery and recycle operations in the system of Figure 2 may be, as shown, like those of Figure 1 as described above.

Since as pointed out above, pentaerythritol will to some extent migrate through the anode exchange membrane, it may be desirable to eliminate the recovery of pentaerythritol from the formic acid solution. For this purpose, the initial aqueous pentaerythritol containing sodium formate may be concentrated to a slurry so that only about 5% of the pentaerythritol is in solution, while all of the sodium formate remains in the solution that is fed to the dissociation zone. With only about 5% of the original pentaerythritol in solution, the amount that migrates through the membranes is greatly reduced and may be 0.25% or less of the original pentaerythritol content.

These ion exchange membranes, for the most part, have the properties of allowing the passage of electrically charged ions and preventing the passage of organic and other unionized material. In this process 90–95% of the sodium formate can be removed from the pentaerythritol solution. This makes the purification of pentaerythritol much easier by eliminating many of the fractional crystallization steps.

Since sodium formate is disassociated and separated as formic acid and sodium hydroxide solutions, no filters, centrifugals, driers, extra chemicals, or solids handling equipment is necessary. The sodium hydroxide may be reused in the reaction without further treatment and the formic acid concentrated for sale. Therefore, the advantages of the electrolytic process are as follows:

(1) Higher recovery of formic acid and sodium hydroxide.
(2) Recovery of sodium hydroxide for reuse.
(3) Less processing and process equipment needed.
(4) Easier purification of the pentaerythritol because of the ash removal in this manner.
(5) Eliminates the need for sodium or calcium sulfate processing or disposal.

In the above processes, enough formic acid may be recycled from the anode compartment back to the dissociation compartment to maintain a pH below 8 to prevent degradation of the pentaerythritol at temperatures above 120° F.

As exemplary of various features that may particularly be given for application of the present invention, operating examples are given below. But in connection with those examples, the following considerations are given.

Pentaerythritol solutions utilizable in the present invention are well illustrated by those of the character described above and containing from 1 to 50% sodium formate and from 3 to 50% pentaerythritol. Also slurries containing from 3 to 10% pentaerythritol in solution and 1 to 50% sodium formate in solution and pentaerythritol crystals in suspension may be purified by this invention. While alkali metal formates are the impurities commonly present illustrated by sodium formate, alkaline earth metal formates, such as calcium formate may also be processed. However in such cases, the concentration of formate will be more limited as for example from about 1 to 18% calcium formate.

The PE slurry may be obtained by concentration in a vacuum evaporator. It is more desirable not to remove the PE from the slurry before deionizing since the residual sodium formate may have to be washed from the PE crystals on the filter or centrifuge. This wash water would usually have to be reprocessed to recover the PE that was carried along with the sodium formate. If the solution was deionized before removing the PE crystals from the slurry, the washing operation would not be necessary to remove the sodium formate.

Ion exchange membranes that may be used for the processes described herein are available on the market and have been described in the literature. For use herein, particular considerations should be kept in mind and the more closely these are approached, the more effective is the separation. Examples of ion exchange membranes are Permaplex A–10 and C–10 and Amberplex A–1 and C–1.

Ion exchange membranes are ion exchange resins produced in sheets rather than in the conventional bead form. The bead form is generally limited to batch operation and dilute salt solutions and requires chemical regenerants. The sheet or membrane form can be used in continuous operations and no chemical regenerants are required since they depend on electrical energy for the transfer of ions. The most important property of ion exchange membranes in their permeability to ions of one charge and impermeability to ions of opposite charge and also impermeability to non-ionized materials.

Selective permeable materials are found in clay and shale beneath the earth's surface and in plant and animal membranes. Synthetic membranes have been manufactured from a variety of materials.

In the instant process, any selective permeable material can be used for the membranes having the following properties:

(a) The anion membrane must be permeable to negatively charged ions and impermeable to positively charged ions and non-ionized material. It must be insoluble in, and unaffected by, the solutions under treatment at the operating temperature.

(b) The cation membrane must be permeable to positively charged ions and impermeable to negatively charged ions and non-ionized materials. It must also be insoluble in, and unaffected by, the solutions under treatment at the operating temperature.

Direct current is used and current densities may vary over substantial values depending on a number of factors. But preferred ranges will generally lie in the range of from about 5 to 100 amp. per square foot of membrane surface, with more desirable values of from about 25 to 50 amp. per square foot of membrane surface.

The initial concentration of electrolyte in both the anion and cation compartments need to be only enough to start the flow of current (0.1 normal is sufficient). In the three compartment cell, only formic acid and sodium hydroxide should be used for electrolytes to prevent contamination of the products. But in the four compartment cell, any acid electrolyte could be used in the anode compartment that is stable in the presence of the anode.

Any materials may be used for electrodes if they have the properties of conducting electric current and if the material is relatively unaffected by the electrolyte in the particular cell where used and the product is not deteriorated or contaminated. For example, stainless steel and carbon were used for the cathode and platinum for the anode.

The sodium hydroxide concentration in the cathode compartment can be allowed to build up to 50%. The more desired concentration is between 20 and 30%.

About 20% formic acid in the anode compartment is the maximum carried since there is some decomposition of the acid at higher concentrations. This applies to continuous operation as well as batch operation.

Methyl isobutyl ketone is the most satisfactory solvent found for extracting formic acid from PE solution.

Temperatures in the center cell are unimportant if the pH is maintained below 8. However, the temperatures may vary substantially as for example up to 120° F. in the center cell.

Hydrogen is produced by the electrolysis of water at the anode in both compartment cell 3 and compartment cell 39 which serves to saturate the formic ion. The advantage of the four compartment cell is that the formic acid is made without being in contact with the anode material or the oxygen which is also produced from the electrolysis of water. This permits use of a less expensive anode material such as lead and the use of electrolyte such as sulfuric acid which is stable under the severe oxidizing conditions found in the anode compartment.

Since compartment 3 or formic acid compartment 23 is separated from anode compartment 39 by a cation membrane, the hydrogen passes through the cation membrane since it is attracted in that direction by the cathode, and saturates formic ion in compartment 23. Since the cation is impermeable to the negative ions or sulfate group the sulfuric acid stays in anode compartment 39.

The following examples illustrate the invention, parts or percents being by weight unless otherwise indicated.

I.

A three compartment cell is set up to hold 200 ccs. of aqueous pentaerythritol sodium formate solution in the center or dissociation compartment. A platinum anode is inserted in the anode compartment. A stainless steel cathode is inserted in the cathode compartment. The anode compartment is sealed off from the center cell by an anion exchange membrane and the cathode compartment is sealed off from the center cell with a cation exchange membrane. Weak solution of sodium hydroxide is placed in the cathode compartment for an electrolyte and a weak solution of formic acid is placed in the anode compartment for an electrolyte. Direct electric current is applied to the cathode and anode and over a period of 12 hours 95% of the sodium formate present in the pentaerythritol solution has been disassociated into sodium hydroxide and formic acid. Approximately 95% of the sodium hydroxide formed is recovered from the cathode compartment and 80% of the formic acid may be recovered from the anode compartment. Only 5% of the original sodium formate is left in the pentaerythritol solution which is drained from the center cell. This operation can be carried out batchwise or continuous.

II.

Same as above except that sufficient formic acid is recycled from the anode compartment back to the center cell to maintain a pH below 8. This procedure stops discoloration of the pentaerythritol solution in case the temperature should rise above 120° F.

III.

Same as Example I except that the formic acid solution is continuously extracted in a counter-current extractor with methyl isobutyl-ketone to remove the formic acid from the pentaerythritol and water. The pentaerythritol-water solution is recycled back to the center or dissociation cell where all the pentaerythritol is recovered in the deionized solution.

IV.

Same as Example I except that a four compartment cell is used as in Fig. 2. A sulfuric acid solution is used for an electrolyte in the anode compartment and lead is used for the anode. The formic acid collects in the anode compartment and is continuously drained, extracted with methyl isobutylketone as in Example 3 and the water and pentaerythritol solution returned to the center cell compartment where all the pentaerythritol is recovered in a substantially deionized solution.

What I claim as my invention is:

1. A method of deionizing an aqueous pentaerythritol solution containing sodium formate as impurity which comprises electrodialyzing such pentaerythritol solution in a dissociation zone between anion and cation exchange membranes with direct current, while maintaining the pH of such solution below about 8 by adding formic acid thereto in order to inhibit degradation of said pentaerythritol, to transport formic acid ions from said zone through an anion exchange membrane to an anode compartment, wherein formic acid is obtained, and to transport sodium ions away from said zone through a cation exchange membrane to a cathode compartment, wherein caustic soda is obtained, and thereafter recovering substantially deionized pentaerythritol from said dissociation zone.

2. The method of claim 1 in which a portion of said formic acid which is obtained is recycled to said dissociation zone to maintain the desired pH therein.

3. The method of claim 1 in which said formic acid obtained in said anode compartment is extracted with a solvent for formic acid which is substantially a non-solvent for pentaerythritol and water.

4. The method of claim 3 in which the pentaerythritol is recycled to the dissociation zone.

5. The method of claim 1 in which the anode compartment is divided into two zones by a cation membrane, one of said two zones containing formic acid and the other of said two zones being a non-formic acid zone, with the anode being immersed in said latter zone.

6. The method of claim 1 in which the pentaerythritol solution in said dissociation zone is concentrated to a slurry having about 5 percent of pentaerythritol in solution.

References Cited in the file of this patent
UNITED STATES PATENTS

| | | |
|---|---|---|
| 1,690,363 | Egleson | Nov. 6, 1928 |
| 1,972,561 | Heubaum | Mar. 12, 1932 |
| 2,111,360 | Cutting | Mar. 15, 1938 |
| 2,153,507 | Mann | Apr. 4, 1939 |
| 2,463,610 | Glassmire et al. | Mar. 8, 1949 |
| 2,521,247 | Huebotter | Oct. 16, 1951 |
| 2,636,852 | Juda et al. | Apr. 28, 1953 |
| 2,694,680 | Katz et al. | Nov. 16, 1954 |
| 2,751,335 | Carver et al. | June 19, 1956 |
| 2,802,344 | Witherell | Aug. 13, 1957 |

FOREIGN PATENTS

| | | |
|---|---|---|
| 682,703 | Great Britain | Nov. 12, 1952 |

UNITED STATES PATENT OFFICE
CERTIFICATE OF CORRECTION

Patent No. 2,865,822                                        December 23, 1958

Clarence R. Murphy

It is hereby certified that error appears in the printed specification of the above numbered patent requiring correction and that the said Letters Patent should read as corrected below.

Column 2, line 12, for "an ion" read -- an anion --; column 3, line 7, for "modificaion" read -- modification --; line 22, for "compartmment" read -- compartment --; column 4, line 39, for "in their" read -- is their --.

Signed and sealed this 21st day of April 1959.

(SEAL)
Attest:

KARL H. AXLINE
Attesting Officer

ROBERT C. WATSON
Commissioner of Patents